United States Patent
Tucker et al.

(10) Patent No.: US 7,783,393 B2
(45) Date of Patent: Aug. 24, 2010

(54) ENHANCED VERTICAL SITUATION DISPLAY

(75) Inventors: Michael J. Tucker, Lynnwood, WA (US); Sherwin S. Chen, Bellevue, WA (US); John Wiedemann, Bothell, WA (US); Jason L. Hammack, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1036 days.

(21) Appl. No.: 10/883,286

(22) Filed: Jun. 30, 2004

(65) Prior Publication Data

US 2006/0004496 A1 Jan. 5, 2006

(51) Int. Cl.
*G05D 1/08* (2006.01)
*G01C 23/00* (2006.01)
*G01C 5/00* (2006.01)
*G06F 7/70* (2006.01)
*G06G 7/70* (2006.01)
*G08B 21/00* (2006.01)

(52) U.S. Cl. .................. 701/4; 701/3; 701/7; 701/9; 701/14; 701/15; 340/945; 340/959; 340/961; 340/963; 340/967

(58) Field of Classification Search .............. 340/959, 340/961, 963, 967, 969, 970, 971, 973, 974, 340/975, 976, 977, 979; 701/14, 15, 18, 701/4, 7, 9; 73/178 T
See application file for complete search history.

(56) References Cited

U.S. PATENT DOCUMENTS

| | | | |
|---|---|---|---|
| 3,191,147 A | | 6/1965 | Majendie |
| 4,247,843 A | | 1/1981 | Miller |
| 4,325,123 A | | 4/1982 | Graham |
| 4,792,906 A | | 12/1988 | King et al. |
| 4,825,374 A | * | 4/1989 | King et al. .................. 701/5 |
| 4,843,554 A | * | 6/1989 | Middleton et al. ............ 701/15 |
| 4,860,007 A | | 8/1989 | Konicke |
| 5,289,185 A | * | 2/1994 | Ramier et al. ............... 340/971 |
| 5,420,582 A | | 5/1995 | Kubbat |

(Continued)

FOREIGN PATENT DOCUMENTS

EP 0 370 640 5/1990

(Continued)

OTHER PUBLICATIONS

U.S. Appl. No. 10/746,883, Boorman.

(Continued)

*Primary Examiner*—Khoi Tran
*Assistant Examiner*—Nicholas Kiswanto
(74) *Attorney, Agent, or Firm*—Klintworth & Rozenblat IP LLC

(57) ABSTRACT

A vertical situation display system for use in a vehicle such as, for example, an aircraft, is provided. A side view of an intended route of flight may be shown with altitude restrictions, airspace and instrument approach information, a projected flight path and range to airspeed symbol. The system may show terrain, weather, and traffic information along the intended route of flight. The system may be used in conjunction with a navigational display to enhance situational awareness. The system includes a computer, an electronic display device, an electronic entry device, a memory and a database. The database may contain terrain, airspace and flight planning data and may be updatable.

24 Claims, 11 Drawing Sheets

U.S. PATENT DOCUMENTS

| | | | |
|---|---|---|---|
| 5,715,163 | A | 2/1998 | Bang |
| 5,978,715 | A | 11/1999 | Briffe |
| 5,995,901 | A * | 11/1999 | Owen et al. .................. 701/202 |
| 6,057,786 | A | 5/2000 | Briffe |
| 6,085,129 | A * | 7/2000 | Schardt et al. ................. 701/14 |
| 6,088,654 | A * | 7/2000 | Lepere et al. ............... 701/301 |
| 6,112,141 | A | 8/2000 | Briffe |
| 6,154,151 | A * | 11/2000 | McElreath et al. ........... 340/970 |
| 6,163,743 | A * | 12/2000 | Bomans et al. ................. 701/3 |
| 6,188,937 | B1 | 2/2001 | Sherry |
| 6,389,333 | B1 | 5/2002 | Hansman |
| 6,505,102 | B2 * | 1/2003 | Morizet et al. .................. 701/3 |
| 6,593,858 | B2 * | 7/2003 | Qureshi ....................... 340/976 |
| 6,690,299 | B1 * | 2/2004 | Suiter ......................... 340/973 |
| 6,710,723 | B2 * | 3/2004 | Muller et al. ................ 340/970 |
| 6,720,891 | B2 | 4/2004 | Chen et al. |
| 6,745,113 | B2 | 6/2004 | Griffin |
| 6,934,608 | B2 * | 8/2005 | Qureshi .......................... 701/4 |
| 7,453,375 | B2 * | 11/2008 | Chamas et al. .............. 340/945 |
| 2002/0030610 | A1 * | 3/2002 | Ishihara et al. .............. 340/970 |
| 2003/0058134 | A1 | 3/2003 | Sherry |
| 2003/0132860 | A1 | 7/2003 | Feyereisen |
| 2004/0059474 | A1 | 3/2004 | Boorman |
| 2005/0283281 | A1 * | 12/2005 | Hartmann et al. ............... 701/4 |

FOREIGN PATENT DOCUMENTS

| | | |
|---|---|---|
| EP | 0 489 521 | 11/1991 |
| GB | 886136 | 1/1962 |
| WO | WO-02/24530 | 3/2002 |

OTHER PUBLICATIONS

U.S. Appl. No. 10/746,912, Boorman.
U.S. Appl. No. 10/787,644, Tafs et al.
U.S. Appl. No. 10/798,588, Griffin, III et al.
U.S. Appl. No. 10/798,749, Sandell et al.
U.S. Appl. No. 10/814,369, Chen et al.
U.S. Appl. No. 10/814,494, Gunn et al.
U.S. Appl. No. 10/815,034, Crane et al.
777 Flight Deck (1 page); http://www.meriweather.com/777/777_main.html; [Accessed Jan. 28, 2003].
Hutchins, Edwin, "The Integrated Mode Management Interface," Department of Cognitive Science, University of California, San Diego, Sep. 17, 1996.
Lindenfeld, "What is an FMS?", Flight Management Systems (5 pages); http://www.ultranet.com/~marzgold//FAQ-FMS.html; [Accessed Jun. 3, 2002].
Meriweather's Flight Deck Acronyms & Definitions (4 pages); http://www.meriweather.com/fd/def.html; [Accessed Jun. 3, 2002].
Patent Application Specification, "Methods and Systems for Graphically Displaying Sources for and Natures of Aircraft Flight Control Instructions", Randall J. Mumaw et al., application number unknown, filed Jun. 30, 2004.
Patent Application Specification, "Methods and Systems for controlling the Display of Maps Aboard an Aircraft", Jason L. Hammack et al., application number unknown, filed Jun. 30, 2004.
Patent Application Specification, "Methods and Systems for Displaying the Source of Aircraft Control Instructions", Peter D. Gunn et al., application number unknown, filed Jun. 30, 2004.

* cited by examiner

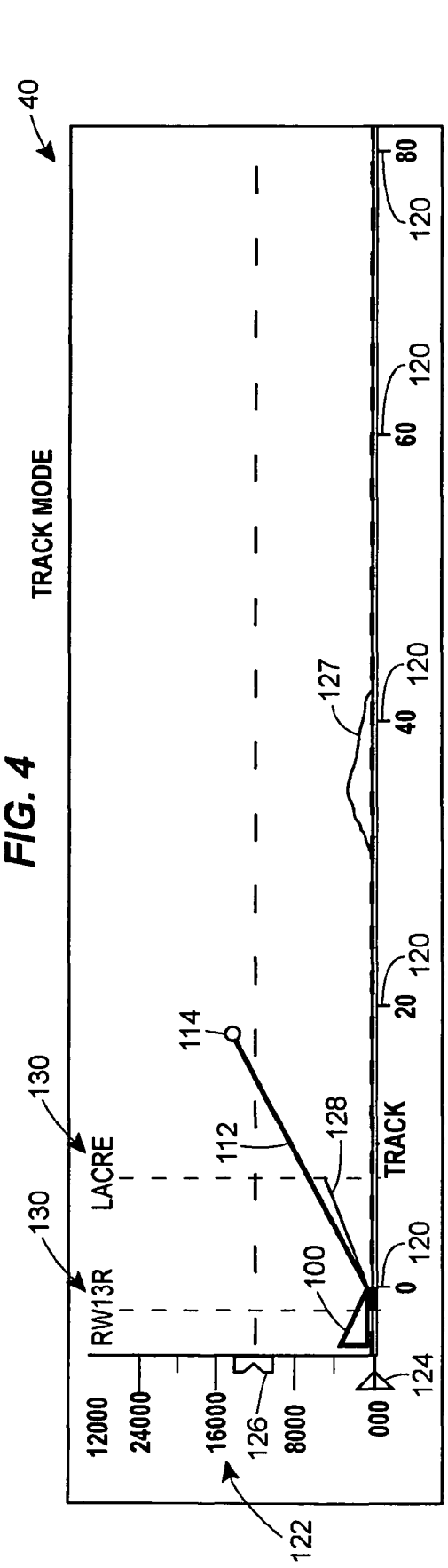
FIG. 4  TRACK MODE
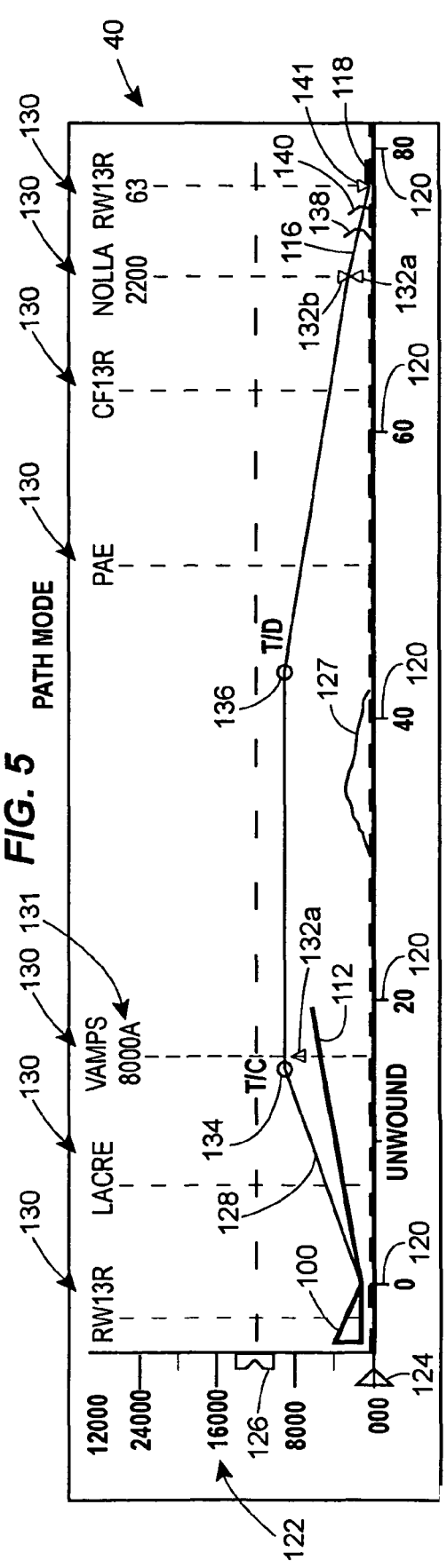
FIG. 5  PATH MODE

ENHANCED VERTICAL SITUATION DISPLAY

FIELD OF THE INVENTION

The invention generally relates to aircraft cockpit displays and specifically relates to vertical displays of a planned or a projected flightpath.

BACKGROUND

As aircraft have become more technologically advanced, cockpit displays have evolved from mechanically driven gages to video display units. Modern video display units are capable of displaying many different types of information at the same time. Altitude, attitude and airspeed information were once displayed on three different instruments. Now, all three are incorporated into one display, the primary flight display (PFD). Navigational information was once derived from a compass, a radio beacon needle and a map. Now, flight path information, heading, groundspeed, wind direction, actual aircraft position and many other types of information may be displayed graphically on one display, the navigation display (ND).

The navigation display was a quantum leap in avionics technology. The navigational display allowed the pilots to have a "bird's eye view" of the flight path and aircraft position. Vertical information was incorporated into the navigational display, but it was limited. Vertical information about other traffic is shown as numbers corresponding to the number of feet above or below the aircraft altitude. Interpreting digital numbers consumes more cognitive effort that interpreting analog or graphical data, which can be important during critical phases of flight. Vertical information about terrain has also been incorporated into the navigational display. This information is also limited, however, because the elevation is given in general terms through color coding. Terrain above the aircraft altitude is shown in red. Terrain shown in red could be two thousand feet or ten thousand feet above the aircraft altitude, the pilot can not tell from looking at the display.

While the navigational display proved to be an invaluable tool for pilots, it soon became apparent that another display was needed, the vertical situation display, which could display the vertical flight path graphically just as the navigational display shows the lateral flight path graphically. Together, the navigational display and the vertical situation display give the pilot a more complete picture of the aircraft flight path and any related hazards. An example of a vertical situation display that gives basic vertical flight path information can be found in U.S. Pat. No. 6,720,891, owned by the assignee of this application, the entirety of which is hereby incorporated by reference herein.

The present invention is directed to overcoming one or more problems or disadvantages associated with the prior art.

SUMMARY OF THE INVENTION

One aspect of the invention is a flight information display depicting flight path information of an aircraft including, an electronic display device, a computer connected to the electronic display device, a database accessible by the computer and an electronic input device. The database may include information such as, for example, terrain, airspace and map data, or any other type of data of use to pilots. The electronic display device may be capable of displaying a multitude of symbols and signs including, but not limited to, an aircraft symbol, a side view of the planned and projected flight path, a terrain symbol and a target airspeed symbol.

The features, functions, and advantages can be achieved independently in various embodiments of the present invention or may be combined in yet other embodiments.

BRIEF DESCRIPTION OF THE DRAWINGS

FIG. 4 shows an embodiment of the invention similar to that of FIG. 3, in a track mode.

FIG. 5 shows an embodiment of the invention similar to that of FIG. 3, in a path mode.

DETAILED DESCRIPTION

Figure 1:
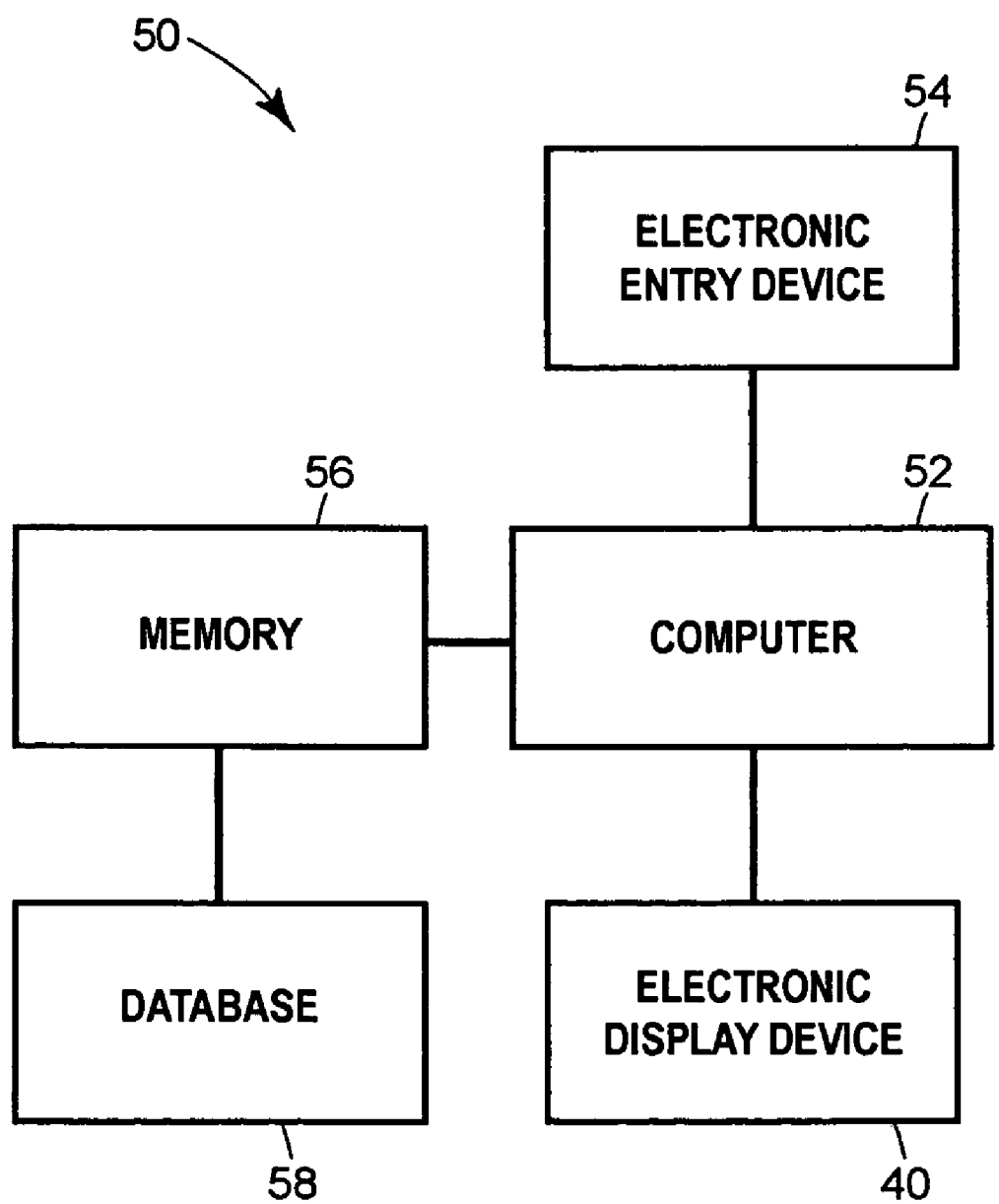
FIG. 1 shows a schematic diagram of a flight information display system.

Referring now to the figures, FIG. 1 shows a schematic depiction of a flight information display system 50. The system 50 includes a computer 52 that may be operatively connected to an electronic entry device 54. The electronic entry device 54 may be used for user inputs. The user may also input information into the system 50 via other aircraft systems. For example, the user may use a flight management computer (FMC), not shown, to input information and preferences into the system 50. The computer 52 includes a memory 56, which stores a database 58. The database 58 may include information on terrain, airspace, flight routes, flight plans, waypoints, instrument approaches, runways and/or any other information that may be needed by an aircraft flight crew. The computer 52 may be programmed to use the information from the database 58 to generate a side view of an aircraft flight plan on an electronic display device 40.

Figure 2:
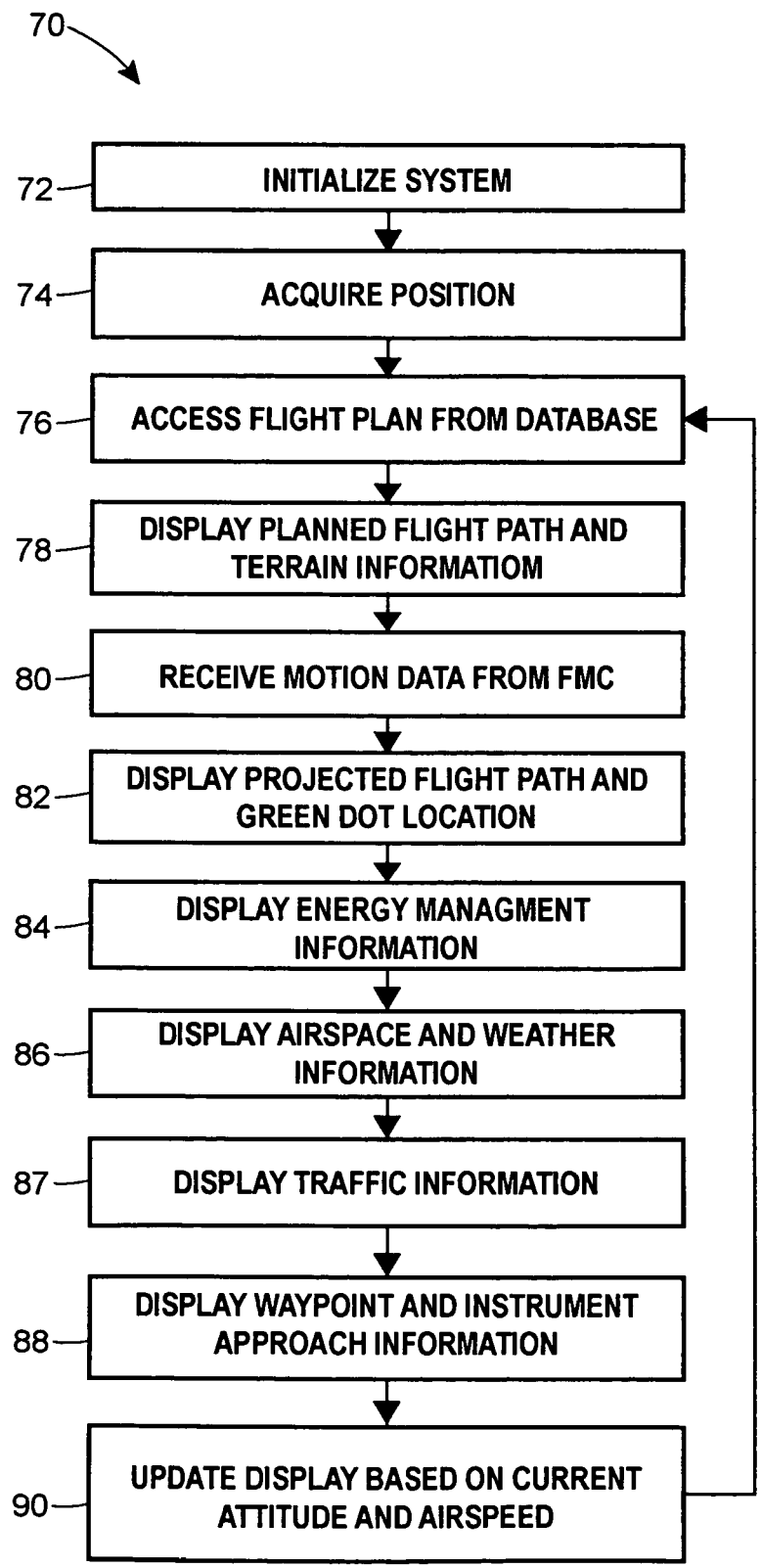
FIG. 2 shows a diagram of software logic that may be used by the system of FIG. 1.

FIG. 2 shows a logic diagram 70 for an operation of the system 50. The system 50 is initialized at 72. This may be done at power up, or at any other time deemed appropriate by the user. The system 50 may acquire position data at 74 from any number of position sensors including, but not limited to, a Global Positioning System (GPS), an inertial navigation system (INS), a terrestrial based navigation system (i.e., VOR or TACAN), a manually input position, a position input from another aircraft system (i.e., autopilot, FMC) and/or any other source of position information.

Flight plan information is accessed at 76. Flight plan information may be accessed from another aircraft system (i.e., FMC or autopilot), or may be input directly into the system 50 manually. The system 50 may display the planned flight path and terrain information at 78, for example, based on the database 58, aircraft position and flight plan. Airspeed and altitude data may be received at 80 from the FMC, directly from the airspeed indicator and altimeter, and/or from any other aircraft system that may generate airspeed and altitude data. The system 50 may use the airspeed and altitude data obtained at 80 to generate the projected flight path and a green dot which may be displayed at 82. The green dot may be a calculated location along the projected flight path at which the aircraft may obtain a desired speed.

Energy management information may be generated and displayed at 84 using the airspeed and altitude data previously received. Airspace information may be generated and displayed at 86 if the user so desires, and airspace information may be obtained from the database 58. Weather information may be generated and displayed at 86. Weather information may be delivered to the system 50 by a weather radar, data link, and/or any other method of delivering weather information. Traffic information may be generated and displayed at 87. Traffic information may be delivered to the system 50 by a transponder, a Traffic Collision Avoidance System (TCAS), data link, and/or any other appropriate device and/or method for delivering traffic information. Waypoint and instrument approach information may be displayed at 88 based on the database, aircraft position and user selection. The display may be updated at 90 to account for changes in altitude and airspeed. The process may be repeated until the aircraft reaches its destination.

Figure 3:
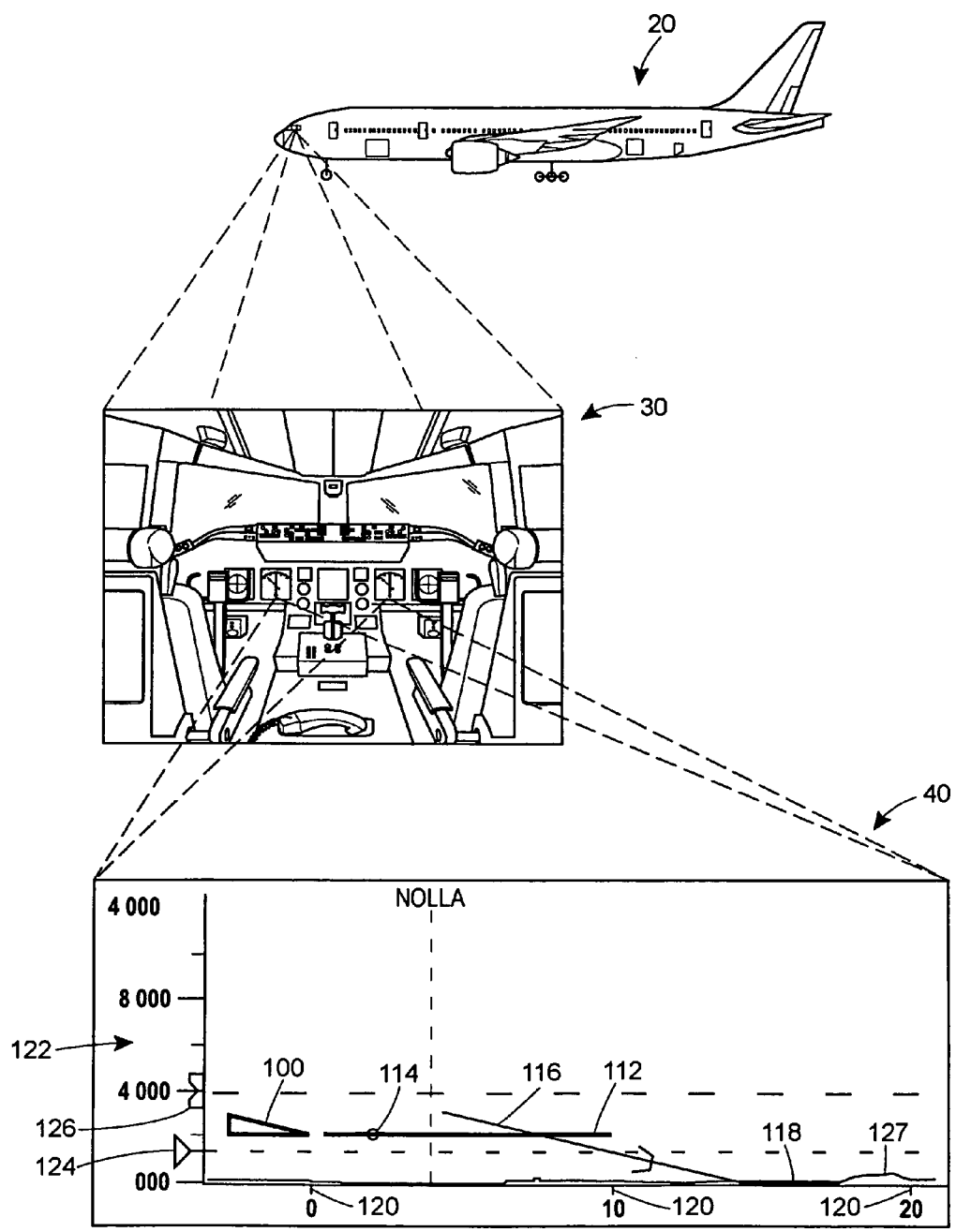
FIG. 3 shows possible positions of an electronic display device in an aircraft cockpit in which the electronic display device depicts a side view of a projected flightpath of the aircraft.

FIG. 3 shows a possible location of the electronic display device 40 in a cockpit 30 of an aircraft 20. The figure shows the electronic display device 40 as incorporated into an existing navigation display (ND). The system 50 may be incorporated into any existing display or may stand alone with a separate electronic display device 40. The electronic display device 40 may be located at any point in the cockpit 30 where space exists and where its use is convenient for the pilots.

The electronic display device 40 shows a baseline vertical situation display (VSD). The electronic display device 40 may show a side view of an aircraft symbol 100 and a projected flight path 112. A green dot 114 may be an estimate of a location that the aircraft 20 may attain a particular speed. A glideslope 116 may be displayed for a runway 118. Distance may be shown on a scale having distance marks 120. An altitude scale 122 may be shown for altitude reference. A decision height reference 124 may be selectable and generally set to a decision height for an instrument approach. An altitude reference "bug" 126 may also be selectable. The electronic display device may also show basic aircraft information. Limited terrain information 127 may also be shown within a corridor about the projected flight path 112.

FIG. 4 shows an embodiment of the invention in a track mode of operation. The display 40 may have all the features of the embodiment in FIG. 3, e.g., an aircraft symbol 100, a projected flightpath 112, a green dot 114, distance marks 120, an altitude scale 122, a decision height reference 124, an altitude bug 126 and terrain information 127. This embodiment may also include flight plan information 128. The flight plan information 128 may be input or selected by the user. The flight plan information 128 may also be automatically downloaded from another aircraft system, such as the flight management computer (FMC).

Terrain information 127 displayed may be based on the projected flight path 112 of the aircraft. A corridor about the projected flight path 112 may be formed. The corridor may gradually increase in width as the corridor gets farther away from the aircraft present position. The corridor width may be set at a predetermined width for any distance in front of the aircraft present position. The corridor may be divided into grid sections, which may be smaller closer to the aircraft present position and larger further away from the aircraft present position. The highest terrain elevation in any grid section may be displayed. Because the terrain information 127 in the track mode is based on the projected flight path 112, the terrain information 127 may only be displayed for terrain in a straight line track based on the projected flight path 112. Waypoint data 130 may also be shown. The waypoint data 130 may be retrieved from the database 58. The range of the track mode may match, and be controlled by, the range selected on the navigation display.

FIG. 5 shows an embodiment of the invention in a path mode of operation. In addition to the features of the track mode, the path mode may also include several other features. The planned flight path 128 may be displayed, which may be useful in flight planning. The terrain information 127 displayed may be calculated in a different way from that used for the track mode. Instead of being based on the projected flight path 112, the terrain information 127 displayed in the path mode may be based on the planned flight path 128. The corridor used for determining terrain information 127 may be based on the actual flight plan route. This gives pilots an accurate representation of the terrain at each point in the flight, including compensating for changes of direction during the flight.

The path mode may include display of a top of climb point 134, a top of descent point 136 and/or any other path-based symbology from the navigation display. The top of climb point 134 and top of descent point 136 may be useful in flight planning, especially in determining whether the aircraft 20 will be able to make an altitude restriction which may be shown as one or more altitude restriction triangles 132*a* and 132*b*. The numerical representation of the altitude restriction 131 is shown under the waypoint 130. The altitude restriction triangle 132*a* with an apex pointing up represents an at-or-above altitude restriction. The altitude restriction triangle 132*b* with an apex pointing down represents an at-or-below altitude restriction. Two altitude restriction triangles together 132*a* and 132*b* with apexes that touch, one pointing up and one pointing down, represent a hard altitude restriction. If a gap exists between the two apexes of the altitude restriction triangles 132*a* and 132*b*, then the altitude restriction is a range of altitudes between the at-or-above altitude restriction triangle 132*a* and the at-or-below altitude restriction triangle 132*b*. The altitude restriction triangles 132*a* and 132*b* may also be displayed in other modes of the VSD.

The path mode also may include a display of instrument approach information, for example, a glideslope 116. A 1000 foot decision gate 138 and a 500 foot decision gate 140 may also be shown, which correspond to decision gates regularly used by pilots to determine whether the approach will be continued, these decision gates may be adjustable by the user. Certain aircraft parameters must be met at each decision gate in order for the approach to be continued, and a visual display of these points may enhance safety and situational awareness. The decision height for an approach may be shown where the decision height reference 124 intersects the glide slope 116. The range displayed in the path mode may match, and be controlled by, the range selected on the navigation display.

Figure 6:
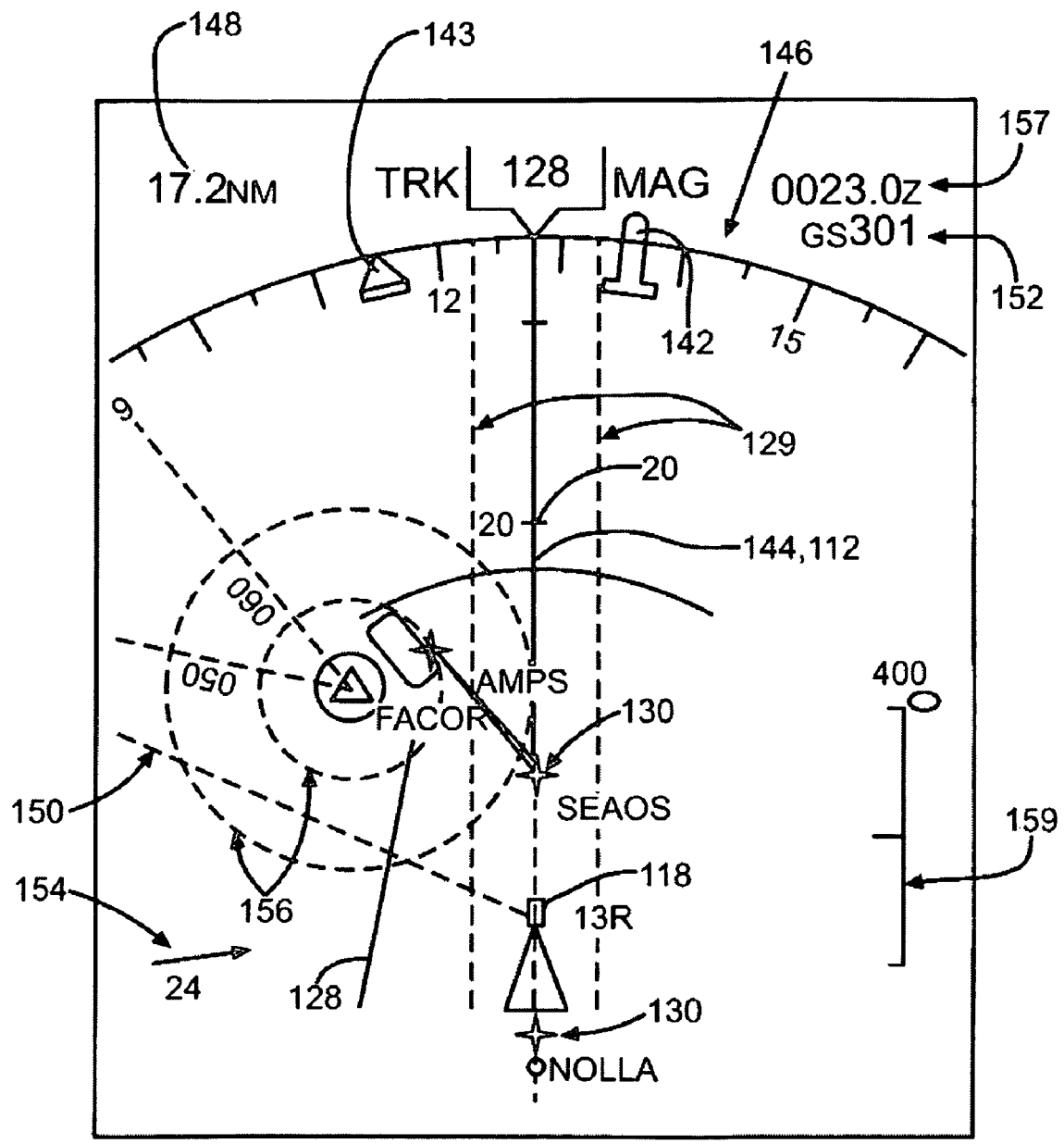
FIG. 6 shows a depiction of a navigation display that may be used in accordance with the invention.

FIG. 6 shows a navigation display that may be used in accordance with the invention. The projected flight path 112 corresponds to the aircraft track 144. The terrain information 127 in the track mode may show terrain along a corridor 129 about the aircraft track 144/112. The planned flight path 128 in the vertical situation display corresponds laterally to the planned flight path 128 in the navigation display. In the path mode, the terrain information 127 may be shown along another corridor about the planned flight path 128. In this figure, the difference in the terrain information 127 displayed between the track mode and the path mode can be understood.

Waypoints 130 are shown which correspond to waypoints 130 in the vertical situation display. At the top of the navigation display is a compass rose 146 including VOR/ADF markers 142 and a selectable heading marker 150. Aircraft heading may be shown with a heading marker 143. At the top right corner of the navigation display is an estimated time of arrival at the next waypoint 157 and current groundspeed 152. At the top left corner of the navigation display is an indication of the distance to the next way point 148. Also shown is an indication of the wind speed and direction 154.

Energy management circles 156 may be shown around any waypoint in the database 58. Energy management circles 156 show the range where speed brakes need to be deployed in order to attain an altitude restriction at the selected waypoint without increasing the aircraft's kinetic energy. Energy management circles 156 also show the range where deploying speed brakes would not allow the aircraft to comply with an altitude restriction at a selected waypoint without increasing the aircraft's kinetic energy. Energy management circles 156 may be very helpful in planning descent points. The only vertical information shown on this navigation display may be the vertical deviation scale 159 shown on the right side of the navigation display. The vertical deviation scale 159 shows whether the aircraft is above, below or at the planned flight path 128.

Figure 7:
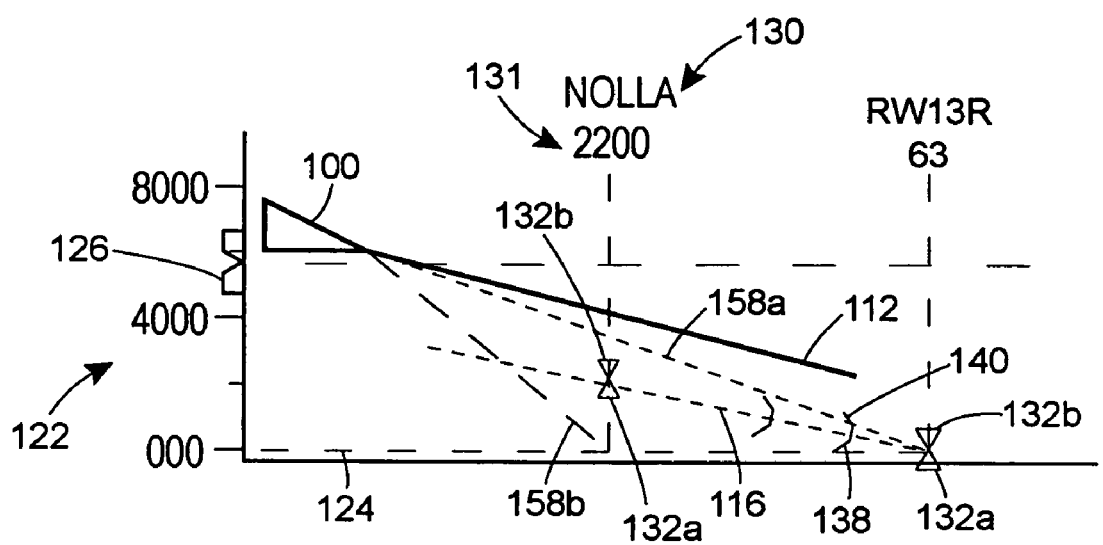
FIG. 7 shows one embodiment of the invention similar to that of FIG. 3 in which the electronic display device depicts energy management information relative to the aircraft.

FIG. 7 shows an embodiment of a display of energy management information 158a and 158b. The energy management information 158a and 158b may be similar to the energy management circles 156 in the navigation display; however, the energy management information 158a and 158b in the vertical situation display shows a range of altitudes attainable by the aircraft without increasing kinetic energy from the current position forward instead of at a particular point, with engines at idle and drag devices in various positions. The top of the energy management information 158a shows the altitude profile of the aircraft with engines at idle in a clean configuration. The bottom of the energy management information 158b shows the altitude profile of the aircraft with engines at idle and speedbrakes deployed. Also shown in this figure are the projected flight path 112, the glideslope 116, and several altitude restrictions 132. The energy management information 158a and 158b may be helpful in descent planning, as is seen in this figure; an engines idle, clean configuration will not allow the aircraft to attain the first altitude restriction 132 at NOLLA. The pilot will need to either add more drag or increase the aircraft speed to meet the altitude restriction 132 at NOLLA. In this embodiment, both the top of the energy management information 158a and the bottom of the energy management information 158b are the same color; however, they have different length line segments.

Figure 8:
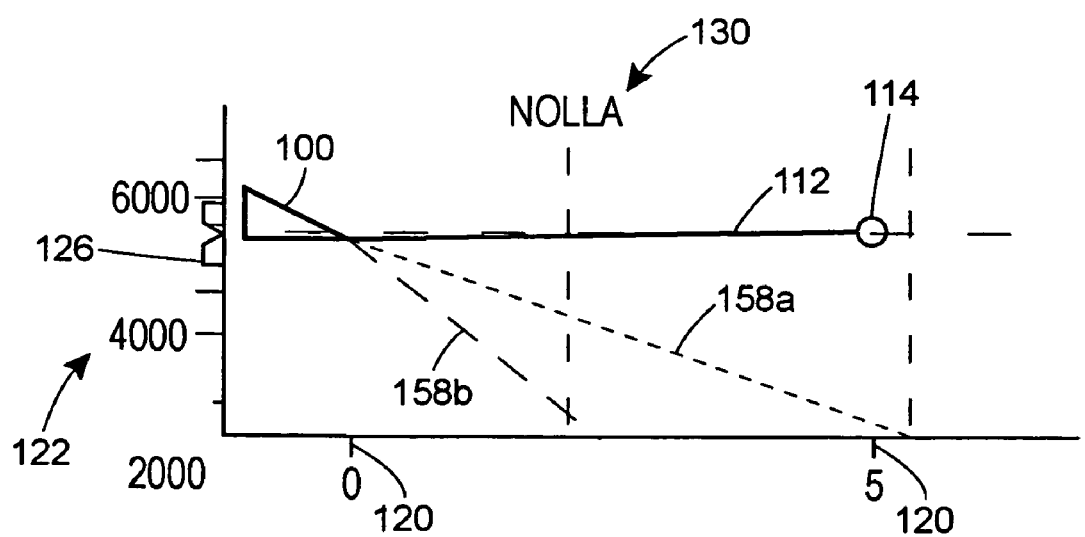
FIG. 8 shows an alternative embodiment of the invention in which the electronic display device depicts energy management information relative to the aircraft.

FIG. 8 shows an alternative embodiment of a display of energy management information 158a and 158b. In this embodiment, the top of the energy management information 158a and the bottom of the energy management information 158b may be depicted using different colors.

Figure 9:
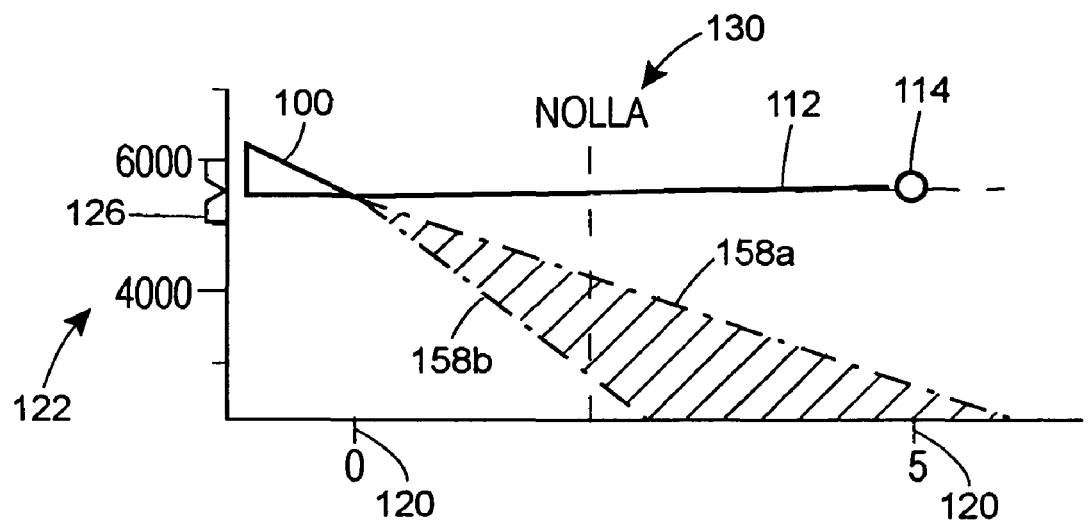
FIG. 9 shows yet another embodiment of the invention in which the electronic display device depicts energy management information relative to the aircraft.

FIG. 9 shows another embodiment with the area between the top of the energy management information 158a and the bottom of the energy management information 158b shaded.

Figure 10:
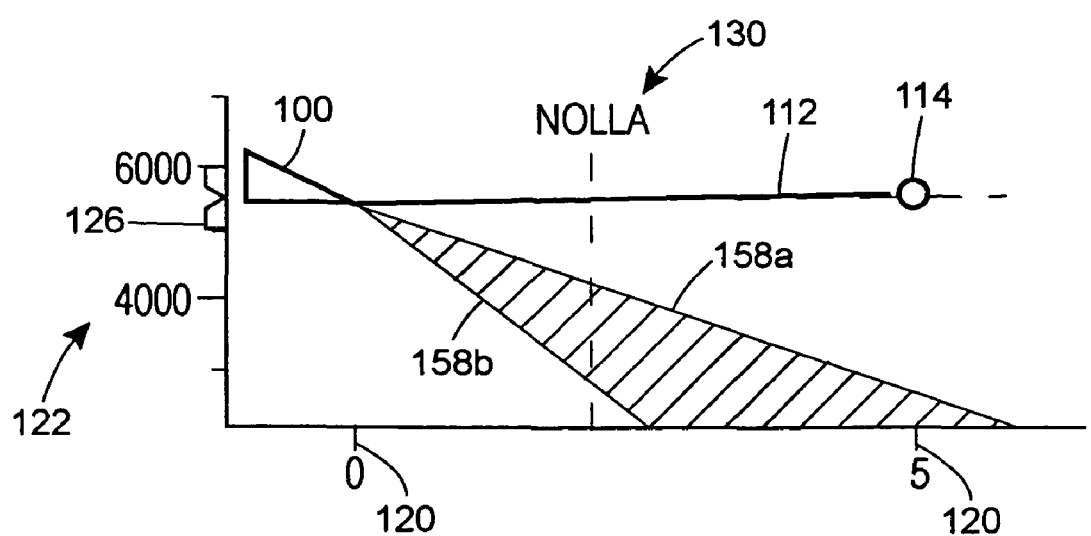
FIG. 10 shows yet another embodiment of the invention in which the electronic display device depicts energy management information relative to the aircraft.

FIG. 10 shows yet another embodiment with the line segments of the top of the energy management information 158a and the bottom of the energy management information 158b removed leaving only the shaded area between the two.

FIGS. 7-10 show many different embodiments for displaying energy management information 158a and 158b relative to the aircraft. One skilled in the art will realize that the possible display combinations are unlimited and there are many other ways to display the energy management information 158a and 158b.

Figure 11:
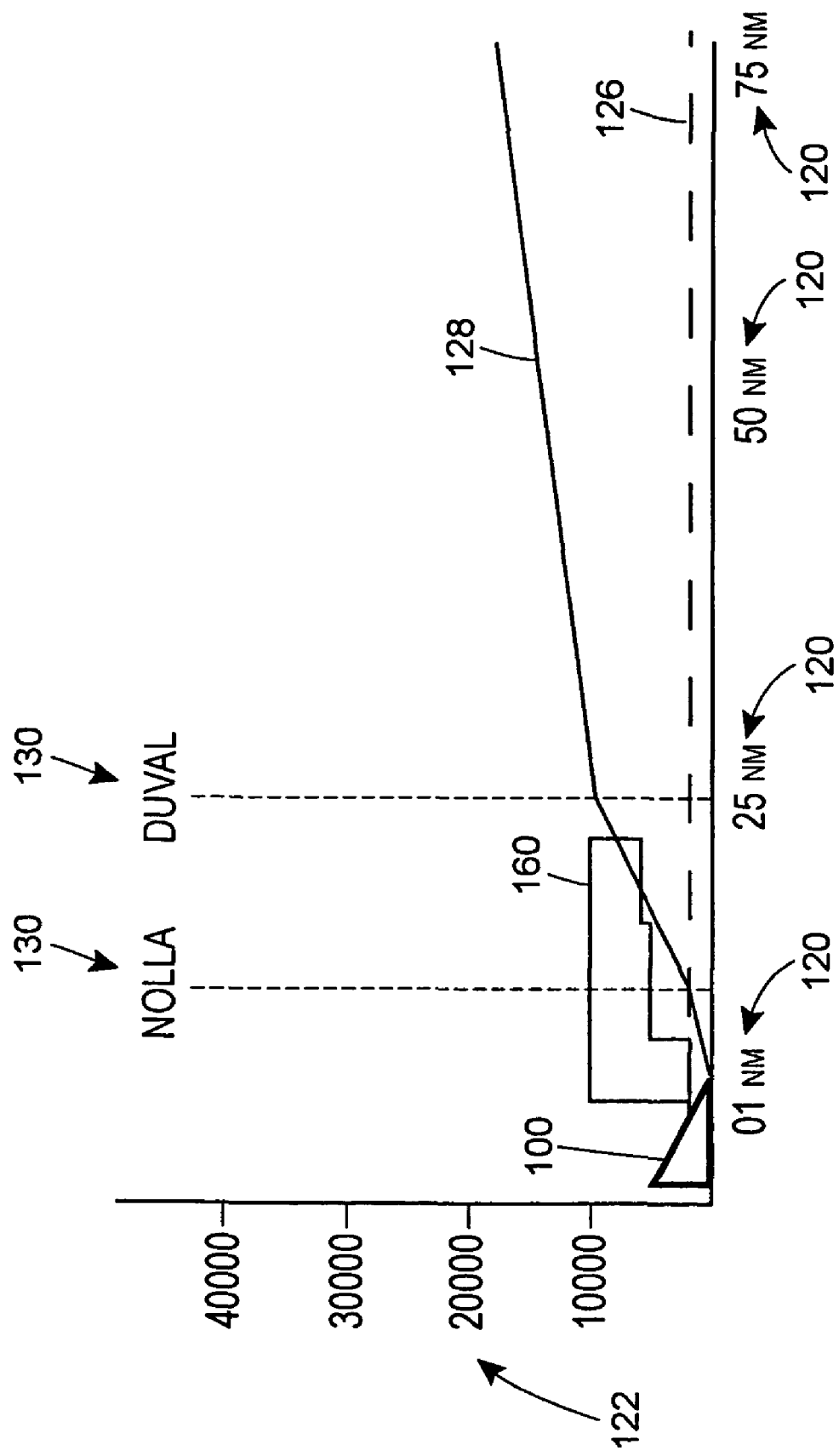
FIG. 11 shows another embodiment of the invention in which the electronic display device depicts a plan mode, having airspace boundaries.

FIG. 11 shows an embodiment of the vertical situation display in the path mode. In this view, airspace information 160 may be depicted. The airspace information 160 may be displayed in a multitude of ways including, but not limited to, solid outline, dashed or broken outline and/or shading. The airspace information 160 may be stored in the database 58, and may allow the pilot to see how the planned flight path 128 or the projected flight path 112 may interact with airspace altitude restrictions.

Figure 12:
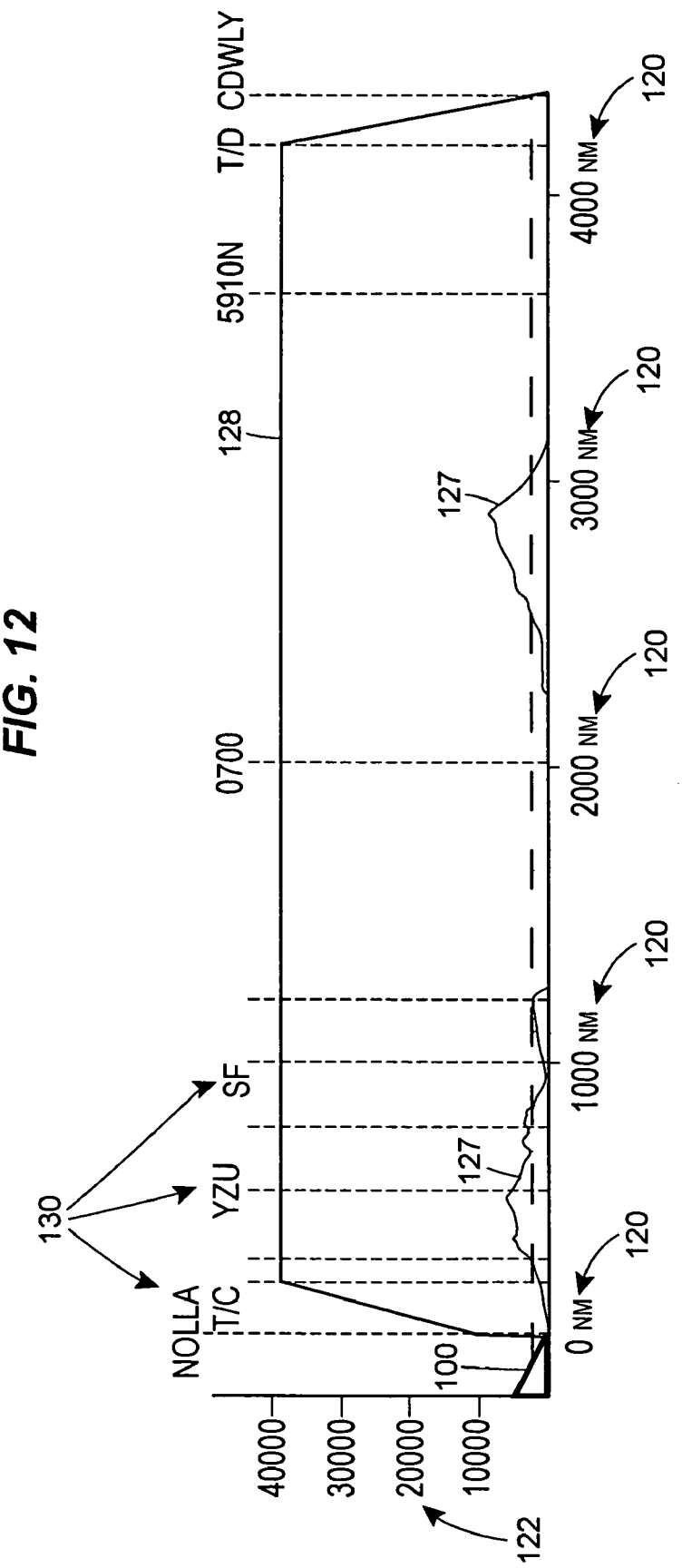
FIG. 12 shows an embodiment of the invention in which the electronic display device depicts a plan mode.
Figure 13:
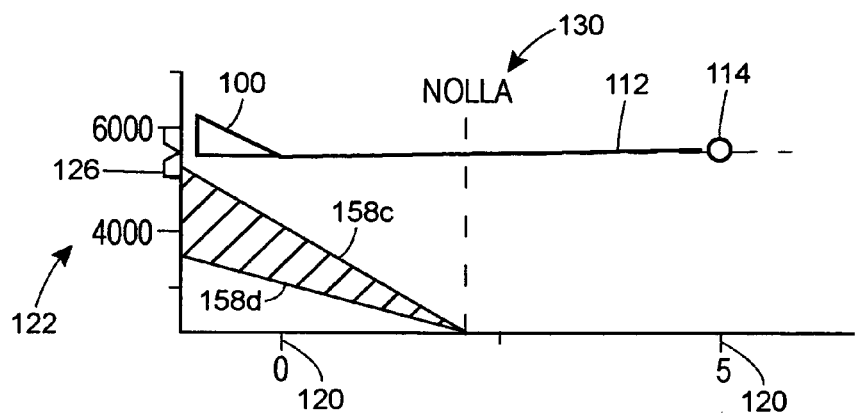
FIG. 13 shows one embodiment of the invention similar to FIG. 3, in which the electronic display device depicts energy management information relative to a waypoint.
Figure 14:
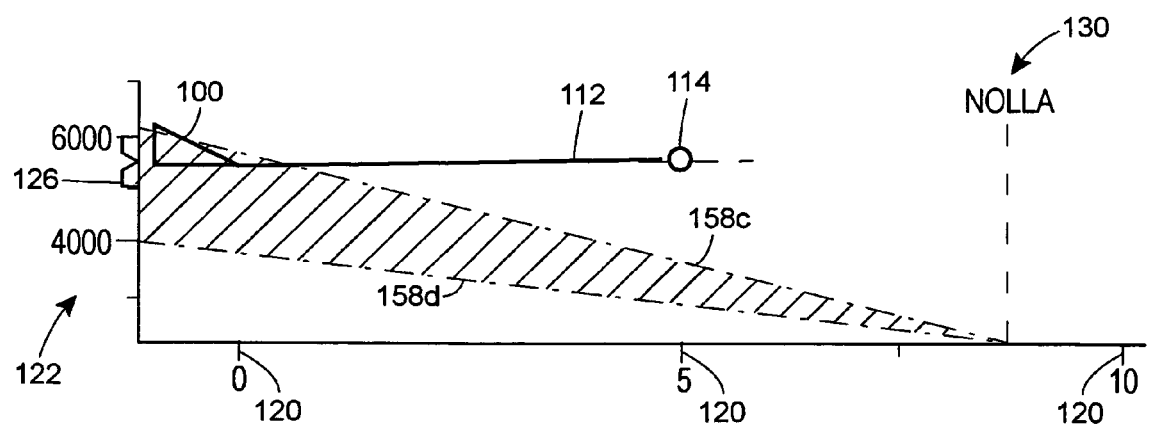
FIG. 14 shows another embodiment of the invention in which the electronic display device depicts energy management information relative to a waypoint.
Figure 15:
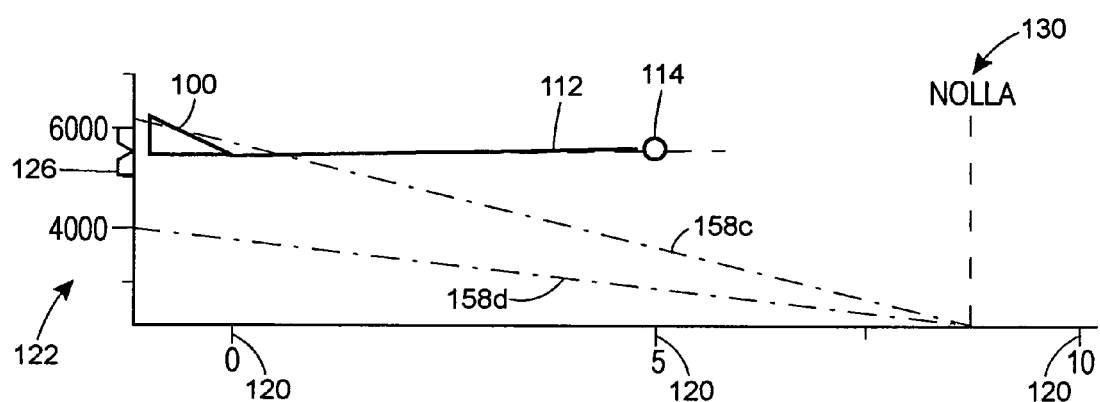
FIG. 15 shows yet another embodiment of the invention in which the electronic display device depicts energy management information relative to a waypoint.
Figure 16:
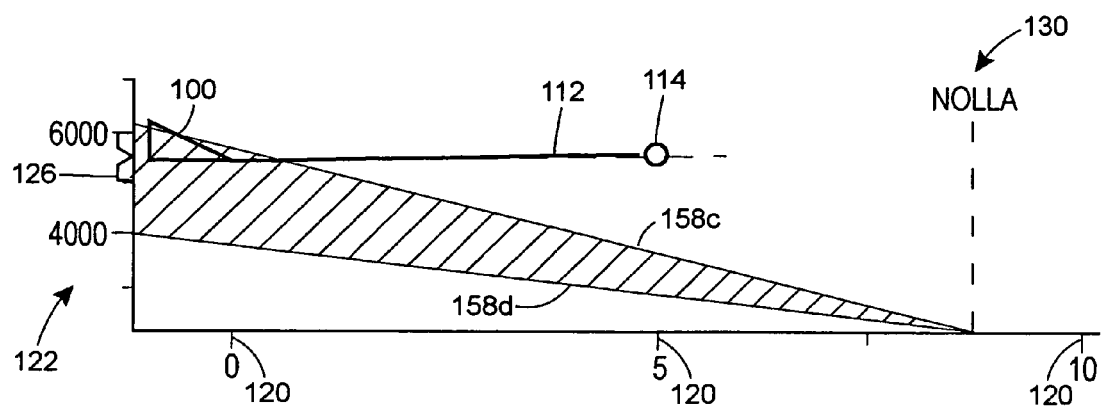
FIG. 16 shows yet another embodiment of the invention in which the electronic display device depicts energy management information relative to a waypoint.

FIG. 12 shows an embodiment of a third operating mode called a plan mode. This mode may include a display that provides situational awareness of the current vertical situation along the entire planned flight path 128. This mode allows the pilot to see terrain along the entire route. Although not shown in FIG. 12, the display in the plan mode may also include tactical tools such as the trend vector, green dot and vertical speed line. Terrain information 127 may be displayed for terrain along the planned flight path 128. This mode may be used for flight planning.

FIGS. 13-16 are similar to FIGS. 7-10 showing many different embodiments for displaying energy management information 158c and 158d relative to a waypoint. One skilled in the art will realize that the possible display combinations are unlimited and there are many other ways to display the energy management information 158c and 158d.

Weather may be displayed in any number of ways including, but not limited to, a combination of colored and shaded area. The weather may be depicted as a shaded area with differing colors to represent intensity, similar to the way weather is currently displayed on a navigational display. The system may acquire the weather data from a weather radar and/or a data link with a ground radar.

Traffic information may also be displayed in a multitude of ways. An aircraft symbol, such as, for example, a small white triangle, may be displayed at the appropriate distance and altitude. Traffic distance and altitude may be obtained from a transponder, a Traffic Collision Avoidance System (TCAS), or from the navigation display. Flight number if available may be displayed in close proximity to the aircraft symbol. The aircraft symbol may change color based on proximity and projected flight path. The color change may correspond to the colors displayed on the navigation display in conjunction with a TCAS. Recommended vertical escape maneuvers generated by a TCAS may also be displayed on the vertical situation display. Traffic lacking altitude information may be displayed, as a different color, shading without an outline, or any other display type based on user preferences or may not be displayed on the vertical situation display. The user may choose whether traffic lacking altitude information will be displayed.

Although the preferred embodiments of the invention have been disclosed for illustrative purposes, those skilled in the art will appreciate that various modifications, additions and substitutions are possible, without departing from the scope and spirit of the invention as disclosed herein and in the accompanying claims. For example, the invention may be adapted for any vehicle which may navigate terrain that has varying elevation and/or that uses vertical path information, such as, for example, an automobile, a submarine, or a space vehicle.

What is claimed is:

1. A flight information display for depicting flight path information of an aircraft, the flight information display comprising: a navigation display showing a top view of the aircraft; a vertical situation display showing a side view of the aircraft; a first symbol displayed in the vertical situation display representing an aircraft position; a second symbol displayed in the vertical situation display representing a planned flight path of said aircraft; a third symbol displayed in the vertical situation display representing a projected flight path of said aircraft; a fourth symbol displayed in the navigation display representing a corridor about at least one of the planned flight path and the projected flight path; a fifth symbol displayed in the vertical situation display representing an estimated location at which said aircraft will attain a target airspeed; and a sixth symbol in the vertical situation display, generated based only on the corridor displayed in the navigation display about said at least one planned flight path and projected flight path, showing terrain information within only the displayed corridor about said at least one planned flight path and projected flight path of the navigation display.

2. A flight information display according to claim 1, further including a representation of weather information.

3. A flight information display according to claim 1, further including at least one symbol representing other aircraft traffic.

4. A flight information display according to claim 1, further including vertical information of at least one airspace type.

5. A flight information display according to claim 1, further including a depiction of energy management information.

6. A flight information display according to claim 5, wherein said energy management information includes an estimated range of altitudes that said aircraft can attain without increasing kinetic energy, with engines at idle and drag devices in various positions.

7. A flight information display according to claim 5, wherein said energy management information includes an estimated range of altitudes said aircraft can attain at a given point without increasing kinetic energy, with engines at idle and drag devices in various positions.

8. A flight information display according to claim 1, further including a depiction of at least one altitude restriction.

9. A flight information display according to claim 8, wherein said altitude restriction is at least one of a manually entered altitude restriction and an altitude restriction stored in a database.

10. A flight information display according to claim 1, further including a depiction of a particular altitude.

11. A flight information display according to claim 1, further including a depiction of at least one of a top of climb point and a top of descent point.

12. A flight information display according to claim 1, further including instrument approach information.

13. A flight information display according to claim 1, wherein the sixth symbol represents the terrain information along the corridor in the planned flight path unless the aircraft deviates more than a preset distance from the planned flight path in which case the sixth symbol represents the terrain information along the projected flight path.

14. A system for display of a planned navigation route, said system comprising: an electronic display device comprising a navigation display showing a top view and a vertical situation display showing a side view; a computer operatively connected to said electronic display device; a database accessible by said computer, wherein said database includes terrain information and said computer generates symbols to depict in the navigation display at least one of a planned path and a projected path for a vehicle, a corridor displayed in the navigation display about at least one of the planned path and the projected path, and terrain information in the vertical situation display generated based only on terrain within the displayed corridor of the navigation display about said at least one planned flight path and projected flight path; and an electronic input device operatively connected to said computer, wherein said computer generates a symbol on said electronic display representing an estimated point at which said vehicle will attain a target speed.

15. A system according to claim 14, wherein said computer generates a depiction on said electronic display device to show a planned path from an origin to a destination.

16. A system according to claim 14, wherein said computer is adapted to generate a depiction of other vehicle traffic on said electronic display device.

17. A system according to claim 14, wherein said computer is adapted to generate a depiction of energy management information on said electronic display device.

18. A system according to claim 14, wherein said computer is adapted to generate a depiction of at least one altitude restriction on said electronic display device.

19. A system according to claim 14, wherein said computer is adapted to generate a depiction of at least one of a top of climb point and a top of descent point on said electronic display device.

20. A system according to claim 14, wherein said database contains airspace information and said computer is adapted to display said airspace information on said electronic display device.

21. A system according to claim 14, further including a wireless transmitter and receiver for the transmittal and receipt of at least one of flight plan data and weather data.

22. A system according to claim 14, further including a weather radar adapted to transmit radar information to said computer for display on said electronic display device.

23. A system according to claim 14, wherein said database contains instrument approach information and said computer is adapted to display said instrument approach information on said electronic display device.

24. A system according to claim 14, wherein a deviation, from the planned path, of a preset distance will change said terrain information displayed along the corridor from terrain information along said planned path to terrain information along said projected path.

* * * * *